March 6, 1934.   V. P. WILLIAMS   1,949,947
PACKING DEVICE FOR UNIVERSAL JOINTS
Filed May 8, 1931   3 Sheets-Sheet 1
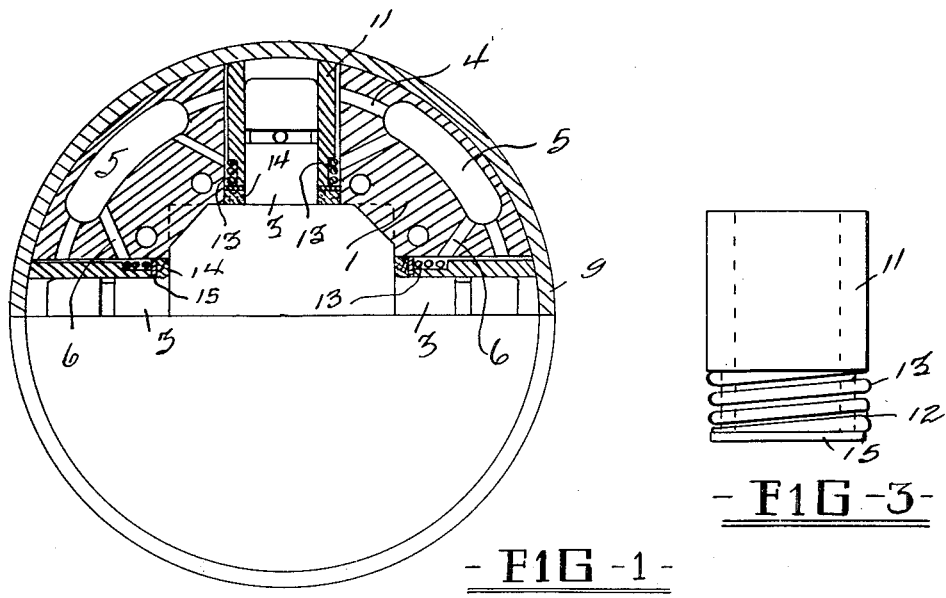
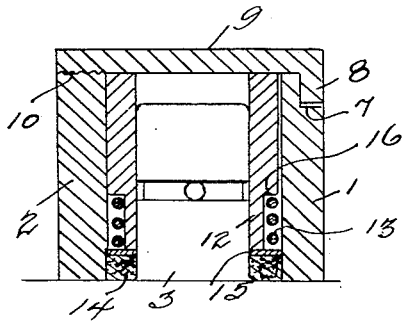
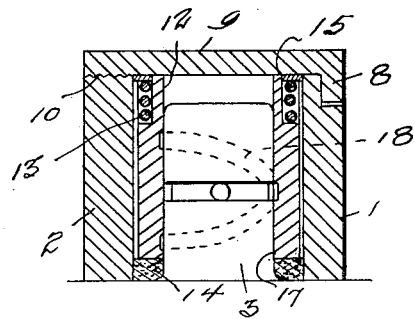
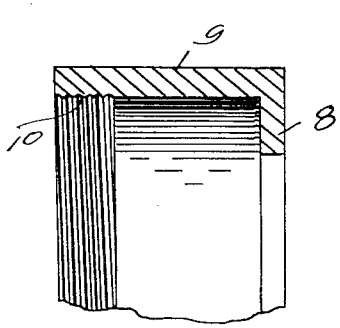
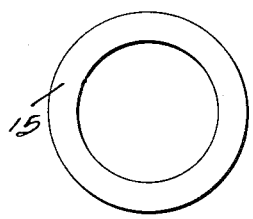
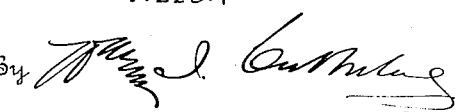

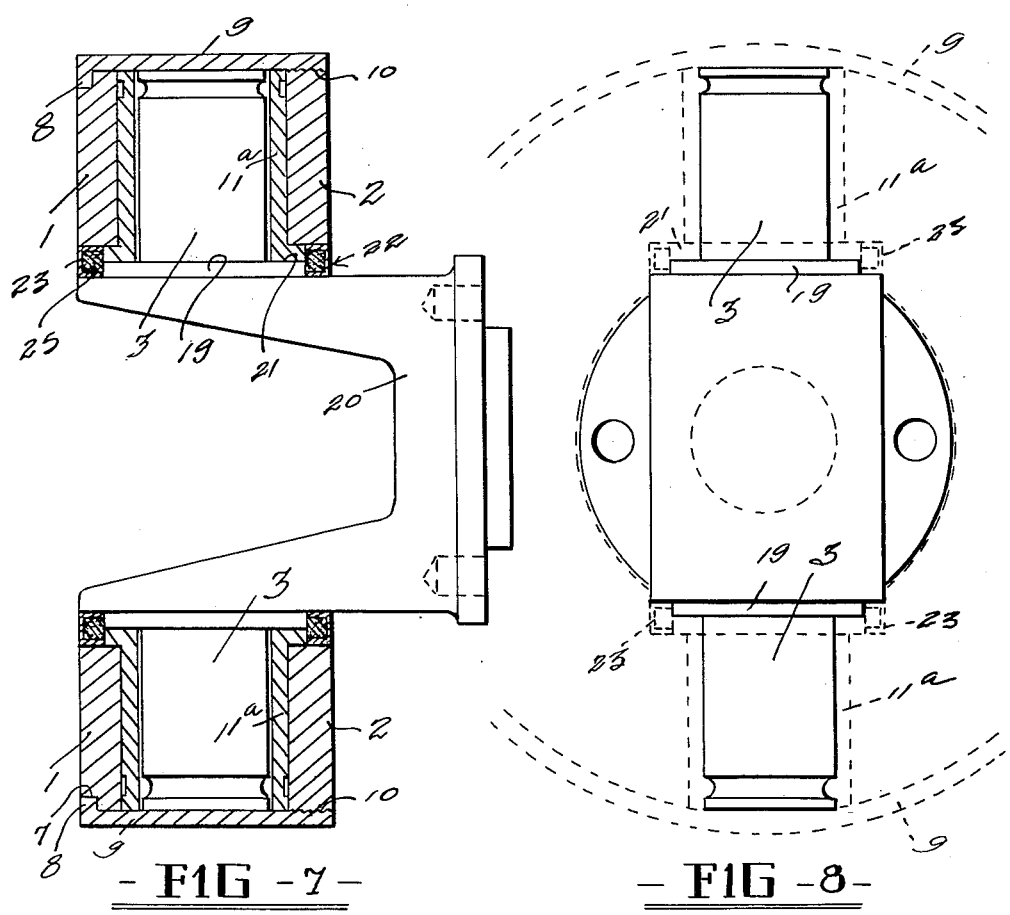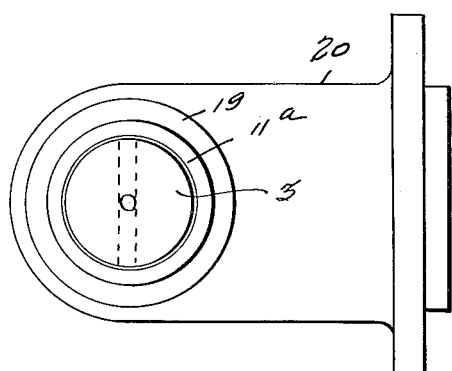

March 6, 1934.      V. P. WILLIAMS      1,949,947
PACKING DEVICE FOR UNIVERSAL JOINTS
Filed May 8, 1931      3 Sheets-Sheet 3
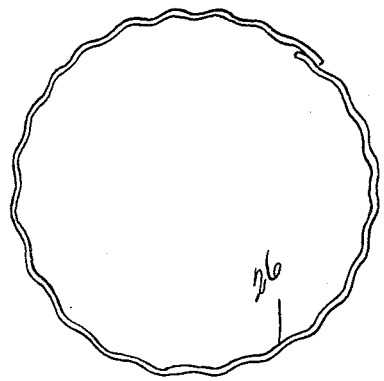
- FIG -10-
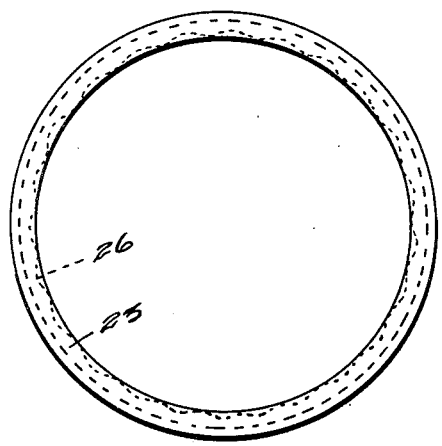
- FIG -11-
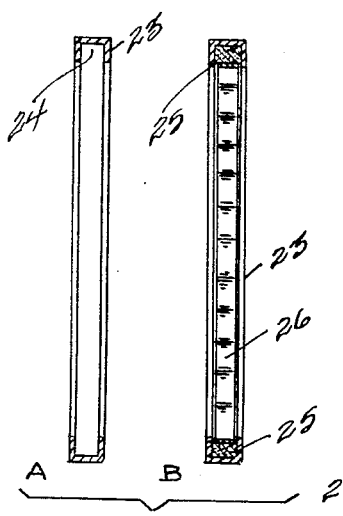
- FIG -12-
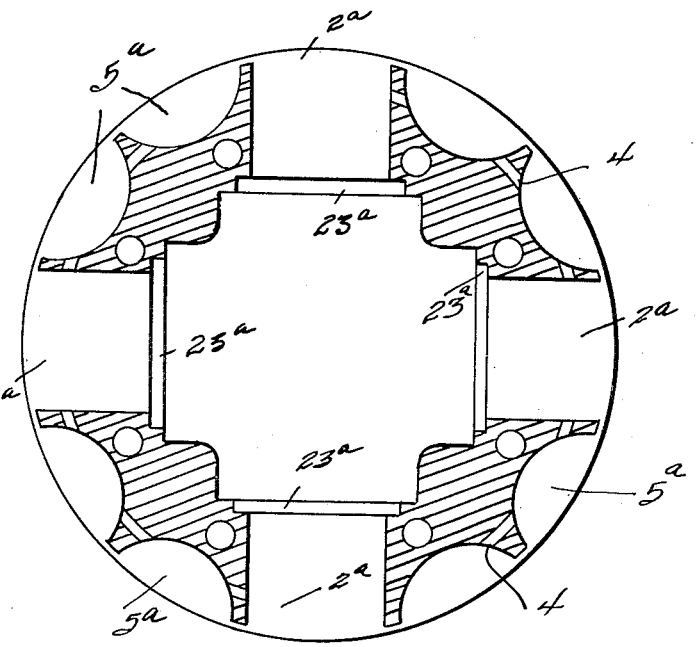
- FIG -13-
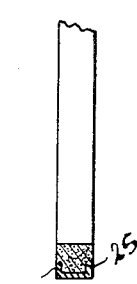
- FIG -14-
Inventor
VILLOR P. WILLIAMS,
By
Attorney Patented Mar. 6, 1934

1,949,947

UNITED STATES PATENT OFFICE 1,949,947

PACKING DEVICE FOR UNIVERSAL JOINTS

Villor P. Williams, Baltimore, Md., assignor, by mesne assignments, to Estelle P. Williams, Baltimore, Md.

Application May 8, 1931, Serial No. 536,025

2 Claims. (Cl. 64—102)

My present invention, in its broad aspect, has reference to improvements in accessible leak proof packing means and automatically adjustable bushings for preventing leakage of oil from about the bases of the pins of a universal joint, and I provide, furthermore, improved means in the form of a unique shroud for quickly assembling the parts of the universal joint, and rendering such parts readily accessible when desired. More particularly, it is my purpose to improve upon the structure of my co-pending application upon Universal joint with adjustable bushing, Serial #524,173, filed March 20, 1931, now matured into Patent No. 1,899,840, wherein a type of bushing is shown which may be readily adjusted to properly compress packing about the bases of the pins of the universal joint to prevent leakage, and wherein there is also shown a plurality of basins or reservoirs in conjunction with the lubricating grooves of the ring sections.

In the present form of my invention I provide, among other things, a shroud for assembling the ring sections and preventing leakage of oil from about the ends of the pins, which has but one flanged edge, and which may be threaded into place and quickly removed to obtain access to all of the interior parts of the joint. My present invention also includes the provision of bushings, one about each of the pins, and spring-pressed to exert at all times the proper amount of pressure upon the packing at the bases of the pins, thereby to automatically take-up and compensate for wear of the packing, to automatically prevent leakage of lubricant from about the bases of the pins. My present joint is of the sectional ring type, each section of the ring having lubricating channels, and there being a plurality of basins or reservoirs for lubricant, formed by enlarging the channels and each reservoir so formed, being provided with an oil duct leading to a point adjacent the bases of the pins.

There is also provided in my present invention, means for greatly simplifying the bushing and packing assembly and rendering the packing more durable. In this form of my invention there is provided about the base of each pin a boss. The bushing for each pin is flanged and the flange is seated on the boss, and about the peripheral edge of the flange and the boss I provide a packing which is contained in and sheathed by a metallic ring, the whole being seated in a recess formed in each ringed section. In assembling this form of my invention, the bushings are first placed about the pins, the packing rings are then placed in position to engage the flanges of the bushings, and the bosses about the bases of the pin, and then the ring sections are disposed in place and the shroud mounted thereon to complete the assembly.

Among the many advantages of my invention may be defined the following:—

First. The bushings are automatically adjustable to exert the proper amount of pressure upon the packing, at all times, so that leakage of lubricant from about the bases of the pins is absolutely and positively prevented, without the necessity of continually and manually adjusting the bushings.

Second. All of the parts of my joint may be quickly disassembled to gain access to any of the interior parts and without the use of special tools.

Third. The shroud is threaded into place, thereby eliminating the necessity of special tools to mount or dismount the shroud.

Fourth. The basins or reservoirs formed by enlarging the oil distributing grooves of the ring sections always provides for a reserve of lubricant to the working parts.

Fifth. The structure of my joint is greatly simplified, rendering it compact, there are no bosses protruding from the outside periphery of the shroud, and the parts of the joint are much more readily and cheaply manufactured.

Sixth. I provide an improved wear-resisting packing, or packing ring, which seats about the base of each pin to prevent leakage therefrom.

Seventh. The modified form of my invention shows a greatly simplified structure wherein no springs are used and wherein each pin is provided with a boss on which each bushing is seated and a packing ring disposed about the boss and the lower flanged edge of the bushing to absolutely prevent leakage, and Eighth. I provide means whereby it is not necessary to utilize, in the ring sections, a high degree of temper, that degree of temper necessary, to provide a proper bearing between the pins and the ring sections, being provided in the bushings thereby greatly increasing facility and ease with which my universal joint may be manufactured and rendering it less costly.

Nine. The flange of each bushing seats against the ring sections to prevent axial movement of the bushings with respect to the pins, and Ten. Said packing seals the joint against entrance of dirt and the like to the pins.

Other and equally important objects of this invention will appear in the following detailed description of its several parts; taken in conjunction with the drawings, forming a part of this application, but interpretation of the scope of the invention should only be conclusive when made in the light of the subjoined claims.

In the drawings wherein is illustrated the preferred embodiment of my invention, together with one modification:—

Figure 1 is a sectional side elevation of the assembly.

Figure 2 is a vertical section through the bushing, shroud and ring sections of one of the pins and shows in detail the parts of my assembly.

Figure 3 is a side elevation of my automatically adjustable bushing assembly.

Figure 4 is a vertical section similar to Figure 2 of the modified form of my automatically adjustable bushing.

Figure 5 is a section through the shroud, per se.

Figure 6 is a view of the washer used in conjunction with my automatically adjustable bushing.

Figure 7 is a vertical section of a modified form of my invention and shows a greatly simplified form of bushing and packing construction.

Figure 8 is a front elevation of the form of my invention shown, in Figure 7.

Figure 9 is an edge view looking down on one of the pins.

Figure 10 is a view of the packing spring, per se.

Figure 11 is a view of the packing ring.

Figure 12, view A, is a section through the packing ring, per se, and view B is a section through the packing ring assembled.

Figure 13 is a view of one ring section, and

Figure 14 is a section of a form of my ring wherein the use of a spring retainer is dispensed with, and wherein the packing extends out beyond the edges of the ring flanges.

Like chaarcters of reference are used to designate like or similar parts throughout the several views of the drawings in which numerals (1) and (2) designates respective sections of the universal joint ring, each of which has diametrically opposed cavities (2A) for receiving the pins (3) of the universal joint and annular lubricating grooves (4) for conveying lubricant to the pins. These grooves are in a closed system of lubrication of the type defined in my co-pending application on Lubricating joint with shroud Serial No. 496,756, filed November 19, 1930, now matured into Patent No. 1,891,858. The portions of the groove between each pin are provided with enlarged basins (5) serving to store lubricant, these being shown in conjunction with my co-pending application upon Universal joint with adjustable bushing, Serial No. 524,173, filed March 20, 1931. However, in conjunction with my present invention there is provided an oil duct (6) directed toward the bases of the pins. Ring section (1) has an annular peripheral groove (7) for receiving the flanged part (8) of a ring-like shroud (9), and ring section (2) has its outside edge threaded to receive the threaded part (10) of the shroud, so that in assembling the universal joint the ring sections are merely placed together about the pins and the shroud threaded or screwed into place after the manner shown in Figure 2.

About each of the pins is a cylindrical bushing (11) having a reduced part (12). In the reduced part is carried a spring (13). About the base of each of the pins is packing (14) and above the packing a washer (15). In assembling the bushing, spring washer and packing about each pin; the packing is first pressed about the base of the pin, the washer is then fitted down on the packing and then the bushing is fitted about the pin and bears upon the washer as shown in Figure 2. The organization is such that there is a press fit between the under wall of the shroud and the upper end of the bushing. As the packing (14) wears, the spring will exert its pressure upon the washer (15) and the shoulder (16) formed by the reduced part of the bushing to always keep the packing under the proper pressure to prevent seepage of oil from about the bases of the pins, while the bushings are always kept in contact with the under side of the shroud and prevented from coming loose. Thus, the operation of my bushing is automatic in that the proper pressure is exerted at all times upon the packing.

In the form of my invention shown in Figure 4, the upper end of the bushing is reduced to receive the spring (13), and the washer (15) bears against the under side of the shroud. Thus, forcing the large end (17) of the bushing against the packing (14) to always keeps it under the proper pressure. In practice I have found it desirable to form a spiral groove or the like (18) in the bushing to properly lubricate the bearing surface of the bushing against the pin.

In the form of my invention shown in Figures 7 to 13, I provide about the base of each pin (3) an annular boss (19); it being understood of course, that the structure of the fork or knuckle (20), the annular boss (19) and the pins (3) is a one piece casting. About each pin is a case-hardened bushing (11A) which has an annularly flanged base (21). In practice this base flange (21) is seated on the boss (19), and about the peripherial edges of the boss (19) and flange (21) is a packing ring (22), said packing ring being seated as shown on the structure of the knuckle (20). Each ring section has an annular cavity (23A) about the pin cavities (2A), so that in assembling this form of my invention, the bushings (11A) are first disposed on the pins (3) with the flanges (21) thereof seating on the bosses (19). The packing rings (22) are then disposed in the position shown in Figure 7 whereupon the ring sections (1 and 2) are mounted in their proper position and the shroud (9) screwed in place to hold the entire structure in assembly.

The packing ring (22) is shown in detail in Figures 10, 11 and 12 and comprises an internally channeled ring (23) shown in cross-section in view A of Figure 12; in the channel (24) of which is disposed suitable packing (25). The packing (25) is held in place by an annular spring member (26) shown in Figure 10. By this construction, while the packing serves to prevent leakage of oil from about the bases of the pins, most of the wear of the packing is eliminated so that the life of the packing is greatly increased. The structure is rendered much more simple and efficient than as heretofore characterized other universal joints in the art. This form of my invention may be used either with the type of basins (5) shown in Figure 1 or the type of basins (5A) shown in Figure 13.

From the foregoing, it is believed, that the operation and construction of my invention will be apparent, but it is again emphasized that interpretation thereof should only be conclusive when made in the light of the claims.

I claim:

1. In a universal joint of the type having a ring retaining the pins of the joint and oil chambers formed in the ring, bushings about the pins, and packing between the lower edges of the bushings and the bases of the pins, spring means pressing upon each packing and bushing to form an oil tight seal, and the ring formed with oil ducts leading from the chambers to adjacent the bases of the pins to lubricate the bushings, pins and spring means.

2. In a universal joint of the type having a ring retaining the pins of the joint and oil chambers formed in the ring, bushings about the pins, and packing between the lower edges of the bushings and the bases of the pins, each bushing having a reduced part, spring means carried in the reduced part of each bushing and pressing upon each packing and bushing to form an oil tight seal, and the ring formed with oil ducts leading from the chambers to adjacent the bases of the pins to lubricate the bushings, pins and spring means.

VILLOR P. WILLIAMS.